(12) United States Patent
Beaty

(10) Patent No.: US 7,357,146 B2
(45) Date of Patent: Apr. 15, 2008

(54) INFLATABLE FLOW CONTROL APPARATUS AND ASSOCIATED METHOD

(76) Inventor: Perry Beaty, 7605 Dunsmuir Ct., Cornelius, NC (US) 28031

( * ) Notice: Subject to any disclaimer, the term of this patent is extended or adjusted under 35 U.S.C. 154(b) by 278 days.

(21) Appl. No.: 10/861,623

(22) Filed: Jun. 4, 2004

(65) Prior Publication Data

US 2005/0268977 A1 Dec. 8, 2005

(51) Int. Cl.
 *B01D 17/02* (2006.01)
(52) U.S. Cl. .......................... 137/172; 138/93
(58) Field of Classification Search ............... 137/172, 137/884, 544, 597, 205; 138/91, 93; 251/61.1
 See application file for complete search history.

(56) References Cited

U.S. PATENT DOCUMENTS

| | | | |
|---|---|---|---|
| 1,165,137 A | 12/1915 | Smith | |
| 2,981,072 A | 4/1961 | Brewington | |
| 4,025,360 A | 5/1977 | Horne et al. | |
| 4,182,581 A | 1/1980 | Uehara et al. | |
| 4,550,751 A * | 11/1985 | Shimamura et al. | 138/93 |
| 4,565,222 A | 1/1986 | Lundman | |
| 4,911,586 A * | 3/1990 | Kelley et al. | 138/93 |
| 4,915,823 A * | 4/1990 | Hall | 210/95 |
| 5,170,986 A * | 12/1992 | Zelczer et al. | 138/93 |
| 5,224,516 A * | 7/1993 | McGovern et al. | 138/93 |
| 5,240,031 A * | 8/1993 | Vigil | 137/315.01 |
| 5,353,842 A | 10/1994 | Lundman | |
| 5,492,619 A * | 2/1996 | Batten | 210/86 |
| 5,639,364 A | 6/1997 | Houck et al. | |
| 5,771,937 A * | 6/1998 | Collins | 138/93 |
| 6,338,595 B1 | 1/2002 | Schollen | |
| 6,406,216 B1 | 6/2002 | Raasch | |
| 6,446,669 B1 * | 9/2002 | Lundman | 138/93 |
| 6,513,588 B1 | 2/2003 | Metcalfe | |
| 6,561,225 B2 | 5/2003 | Raftis | |
| 6,568,429 B2 * | 5/2003 | Lundman | 138/93 |
| 6,820,636 B1 * | 11/2004 | Kien | 137/317 |
| 6,959,734 B2 * | 11/2005 | Lundman | 138/93 |
| 2004/0112451 A1 * | 6/2004 | Lundman | 138/93 |

* cited by examiner

*Primary Examiner*—John Rivell
*Assistant Examiner*—Cloud Lee
(74) *Attorney, Agent, or Firm*—Alston & Bird LLP

(57) ABSTRACT

An inflatable flow control apparatus and method for controlling the flow of a fluid through a drain passage are provided. The apparatus includes an inflatable bladder with first and second opposite sides and an outer surface extending between the sides. A plurality of tubular passages extend through the bladder between the first and second sides. The bladder is configured to be inflated in the drain passage so that the outer surface is disposed against the drain passage and the fluid in the drain passage is directed through the tubular passages. The flow of the fluid through the tubular passages can be selectively controlled, e.g., by opening and closing valves connected to the passages.

30 Claims, 3 Drawing Sheets

_US 7,357,146 B2_

INFLATABLE FLOW CONTROL APPARATUS AND ASSOCIATED METHOD

BACKGROUND OF THE INVENTION

1) Field of the Invention

This invention relates to the control and/or containment of fluids and, in particular, to the control of the flow of fluid through a passage such as a drain pipe.

2) Description of Related Art

A drain pipe typically provides a relatively open passage through which rain runoff or other fluids can flow such as for draining a particular area of land. For example, a paved parking lot often has one or more storm drain pipes that receive runoff from the parking lot and direct the runoff to a creek bed or other drainage area. Thus, rain water and other runoff collected in the parking lot is drained by the storm drain pipe to the drainage area. Similar drainage systems are also provided for other areas including roadways, buildings, and some unimproved lots or fields.

Such drainage systems are typically not equipped to control the flow of fluids therethrough. Thus, if a hazardous or otherwise undesirable material is directed to the drainage system, the material will be spread to the drainage area. For example, if diesel fuel or other hydrocarbons are spilled in a parking lot, the fuel will flow into the storm drain pipe and perhaps through the pipe, depending on the quantity of the fuel that is spilled. If the spill is not cleaned, the fuel can contaminate the pipe, the drainage area, and possibly the water table in the vicinity of the drainage area. The parking lot and pipe can be cleaned by pouring a large quantity of water in the parking lot and through the pipe, thereby washing the fuel from the parking lot and the pipe. However, the water carries the fuel to the drainage area, possibly requiring decontamination of the soil there, which can be time consuming and expensive.

Thus, there exists a need for a device and method for controlling the flow of fluids through a drain pipe or other such passage. The device should be relatively easily installed and removed so that it can be used upon detection of a hazardous spill before the hazardous material is washed from the passage.

SUMMARY OF THE INVENTION

The present invention provides an inflatable control apparatus and an associated method for controlling the flow of a fluid through a drain passage. The apparatus includes an inflatable bladder with two, three, or more tubular passages extending therethrough between first and second sides of the bladder. The bladder is configured to be inflated in the drain passage so that an outer surface of the bladder is disposed against the drain passage and the fluid in the drain passage is directed through the tubular passages. The apparatus can be used in various types of drain passages of various sizes. Further, the apparatus can be relatively easy to install and remove so that it can be used, for example, upon detection of a hazardous spill before the hazardous material is washed from the passage.

According to one embodiment of the present invention, each of the tubular passages defines an inlet at the first side of the bladder. The inlets are defined at different positions on the first side such that the inlets can be positioned at different heights in the drain passage. For example, the inlet of each tubular passage on the first side of the bladder can be 6 inches or more from the adjacent inlets, as measured in a direction parallel to the first side. Each tubular passage can be substantially parallel to a longitudinal axis of the bladder, and a control valve can be fluidly connected to each tubular passage to control the flow of the fluid therethrough.

The second side of the bladder can define a fluid port fluidly connected to an interior space of the bladder and configured to receive a fluid for inflating the bladder. A relief valve can also be provided for releasing gas from the bladder and thereby maintain the bladder at a predetermined pressure. For example, according to one aspect of the invention, the bladder is configured to be pressurized to at least about 50 psi, and the relief valve is configured to limit the pressure in the bladder to a higher maximum pressure such as 250 psi. One or more reinforcement straps can extend between the first and second sides of the bladder to prevent the first and second sides from separating beyond a predetermined length. The bladder can be formed of various flexible materials such as polymers. In some cases, a reinforcement material, which can be formed of aramid fibers, is disposed on at least a portion of the outer surface of the bladder. A portion of the outer surface of the bladder can also define a contoured surface to frictionally engage the drain passage.

According to one embodiment, the present invention provides a method of controlling the flow of the fluid through the drain passage. The method includes disposing the bladder in the drain passage so that the first and second sides of the bladder are directed in opposite directions in the drain passage. The bladder is then inflated to thereby dispose an outer surface of the bladder against the drain passage, such as by injecting a pressurized gas through a port on one side of the bladder into an interior space of the bladder. For example, the bladder can be pressurized to a pressure of 50 psi or more. If the pressure exceeds a predetermined maximum, gas can be released from the bladder through a relief valve. The flow of fluid through the tubular passages extending through the bladder between the first and second sides is selectively controlled, for example, by controlling at least one control valve fluidly connected to the tubular passages. Thus, the flow of the fluid through the drain passage is controlled.

According to one aspect of the invention, the bladder can be disposed in the drain passage with the inlets of the tubular passages at different heights. In operation, a first of the tubular passages can be adjusted to an open configuration, and a second of the tubular passages can be adjusted to a closed configuration so that the fluid in the drain passage at the height of an inlet of the first passage flows through the bladder. Thereafter, the first tubular passage can be closed and the second tubular can be opened so that the remaining fluid in the drain passage at the height of an inlet of the second passage flows through the bladder. Thus, a lighter component of the fluid in the drain passage can be drained through a higher tubular passage, and a heavier component of the fluid can be drained through a lower tubular passage. After use, the bladder can be partially deflated, removed from the drain passage, and then re-used in another drain passage.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
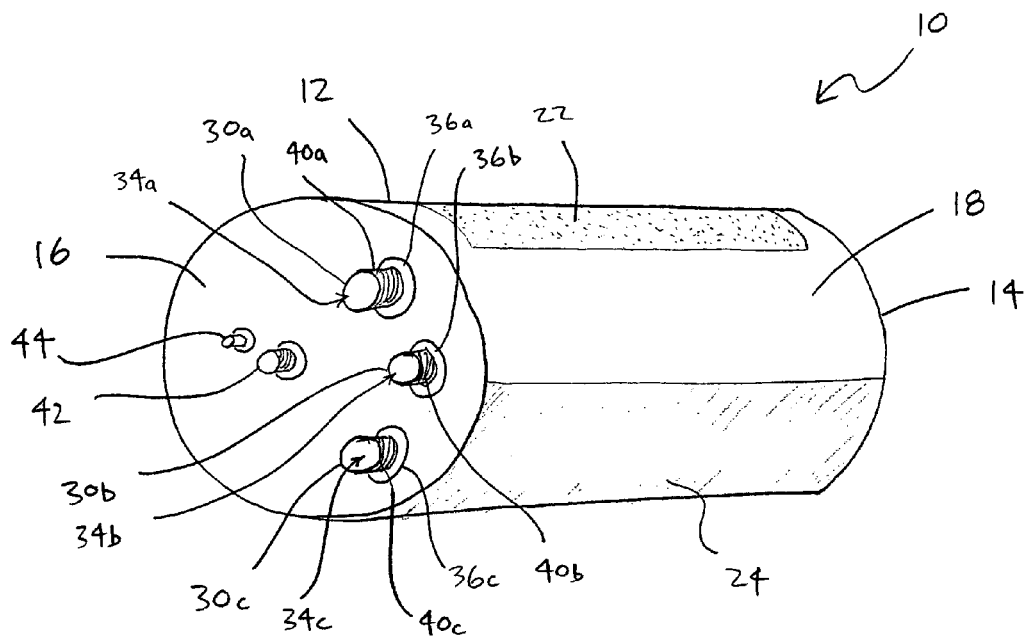
FIG. 1 is a perspective view illustrating an inflatable flow control apparatus according to one embodiment of the present invention.

Referring now to the figures and, in particular, to FIG. 1, there is shown an inflatable flow control apparatus 10, also referred to as an inflatable drain plug, according to one embodiment of the present invention. The inflatable apparatus 10 includes a flexible bladder 12 or bag that is generally cylindrical in shape when inflated, as shown in FIG. 1. The bladder 12 defines first and second sides 14, 16, and a generally cylindrical outer surface 18 extending therebetween. Thus, the bladder 12 defines an interior space 20 (FIG. 2) that can receive a fluid, such as air, for inflating the bladder 12.

The bladder 12 can be formed of various materials, typically a flexible material, including, but not limited to, polymers such as nitrite, vinyl, and the like. The bladder 12 can also include additional members, which can be formed of other materials. For example, as shown in FIG. 1, a contoured material 22 can be disposed on the outside of the bladder 12 to define part or all of the outer surface 18 of the bladder 12 and thereby increase the frictional coefficient of the outer surface 18. In some cases, the contoured material 22 can be a frictional pad with a rough surface that is adhered to the outside of bladder 12. For example, the contoured material 22 can include particles adhered to the bladder 12 to form a non-skid surface.

Additionally, a reinforcement material 24 can be provided on some or all of the outer surface 18 of the bladder 12. For example, the reinforcement material 24 can be a sheet that is adhered to the outside of the bladder 12. The sheet of reinforcement material 24 can be formed of various materials including aramid fibers, such as Kevlar® fibers, a registered trademark of E. I. du Pont de Nemours and Company. The reinforcement material 24 can be provided on part or all of the outer surface 18 of the bladder 12. For example, as shown in FIG. 1, the reinforcement material 24 can be provided on a portion of the bladder 12 that is typically disposed against a bottom of a drain pipe 50 (FIG. 3) where debris can collect.

Figure 2:
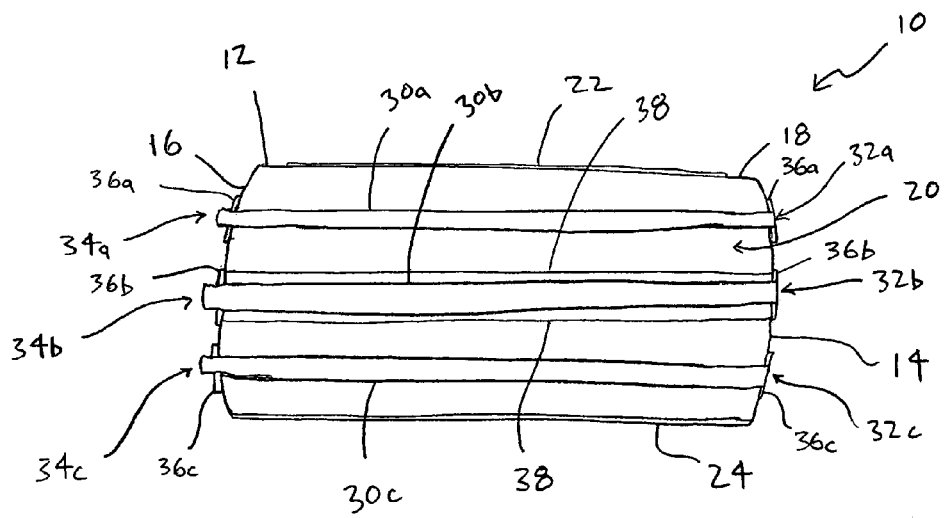
FIG. 2 is a section view illustrating the inflatable flow control apparatus of FIG. 1.

A plurality of tubular passages 30a, 30b, 30c extend through the interior space 20 of the bladder 12 between the first and second sides 14, 16. Each tubular passage 30a, 30b, 30c can be a flexible rubber or polymer hose, a rigid pipe formed of metal or polyvinyl chloride, or other tube-like devices. The apparatus 10 can include any number of the tubular passages 30a, 30b, 30c. The passages 30a, 30b, 30c are typically arranged parallel to one another and parallel to a longitudinal axis of the bladder 12. However, the tubular passages 30a, 30b, 30c can alternatively be arranged in other configurations. As shown in FIG. 2, each tubular passage 30a, 30b, 30c defines an inlet 32a, 32b, 32c at the first side 14 of the bladder 12 and an outlet 34a, 34b, 34c at the second side 16 of the bladder 12. Thus, each tubular passage 30a, 30b, 30c defines a passageway through the bladder 12 and does not communicate with the interior space 20 of the bladder 12. In this regard, the tubular passages 30a, 30b, 30c can include flanges 36a, 36b, 36c at the inlets 32a, 32b, 32c and/or the outlets 34a, 34b, 34c, and the flanges 36a, 36b, 36c can be connected to the respective sides 14, 16 of the bladder 12. For example, in one embodiment of the invention, the flanges 36a, 36b, 36c are formed of vulcanized rubber and cemented, welded, or otherwise secured to the sides 14, 16 so that the interior space 20 of the bladder 12 is sealed around the tubular passages 30a, 30b, 30c. Alternatively, the bladder 12 can include integral tube-like portions that extend between the sides 14, 16 and receive the tubular passages 30a, 30b, 30c therein. In any case, each tubular passage 30a, 30b, 30c defines a path for fluid communication between the sides 14, 16 of the bladder 12.

The tubular passages 30a, 30b, 30c are typically arranged in different configurations in the bladder 12. In particular, the inlets 32a, 32b, 32c can be defined at different positions on the first side 14 so that when the bladder 12 is disposed in a pipe, with the first side directed generally in the longitudinal direction of the pipe, the inlets 32a, 32b, 32c are positioned at different heights. For example, as shown in FIG. 2, the tubular passages 30a, 30b, 30c can be parallel to one another in the bladder, and can extend generally in the longitudinal direction of the bladder 12, so that the exit 34a, 34b, 34c of each tubular passage 30a, 30b, 30c generally corresponds in position on the second side 16 with the position of the inlet 32a, 32b, 32c of the same tubular passage 30a, 30b, 30c on the first side 14. Alternatively, in other embodiments of the present invention, the tubular passages 30a, 30b, 30c can be nonparallel and/or the exits 34a, 34b, 34c can be positioned differently than the inlets 32a, 32b, 32c. In any case, though, the inlets 32a, 32b, 32c of the tubular passages 30a, 30b, 30c can be sufficiently spaced on the first side 14 so that fluids at different heights on the first side 14 of the bladder 12 can be received through the different passages 30a, 30b, 30c. For example, each inlet 32a, 32b, 32c can be a predetermined distance from the adjacent inlet(s) 32a, 32b, 32c as measured in a direction parallel to the first side 14. That is, with the first side 14 positioned in a generally vertical configuration, the centerline of each inlet 32b, 32c can be higher than the centerline of the next lower inlet 32a, 32b by at least the predetermined distance. In some cases, the predetermined distance between the inlets 32a, 32b, 32c can be between about 1 and 12 inches, e.g., about 6 inches, so that fluids stratified at different heights adjacent the first side 14 can be selectively received by the different inlets 32a, 32b, 32c and, hence, through the different tubular passages 30a, 30b, 30c.

Reinforcement straps 38 can also be provided through the interior space 20 between the sides 14, 16 of the bladder 12 to prevent the sides 14, 16 from expanding outwards beyond the length of the straps 38 during inflation or operation of the apparatus 10. The reinforcement straps 38, which can be formed of metal or polymer cables, wires, ropes, or other elongate members, can be secured to the flanges 36a, 36b, 36c of the tubular passages 30a, 30b, 30c or to other reinforced areas of the sides 14, 16.

As illustrated in FIG. 1, a connection device 40a, 40b, 40c is provided on each tubular passage 30a, 30b, 30c at the second face 16. For example, each connection device 40a, 40b, 40c can be a threaded connector that is configured to receive a hose, pipe, valve, or additional connector. Also provided at the second side 16 of the bladder 12 is a port 42 fluidly connected to the interior space 20 of the bladder 12. The port 42 includes a connection feature, such as threads, so that an air compressor or other source of pressurized fluid can be connected to the port 42 for inflating the bladder 12. In addition, a relief valve 44 can be provided at the second face 16 and configured to automatically release fluid from the interior space 20 of the bladder 12 if the pressure in the interior space 20 exceeds a particular threshold. For example, the relief valve 44 can be configured to limit the pressure in the bladder 12 to a maximum operating pressure, such as about 250 psi. At least one of the port 42 and the relief valve 44 can be configured to be selectively opened to deflate the bladder 12. In some cases, the relief valve 44 and the port 42 can be provided as a single device.

Figure 3:
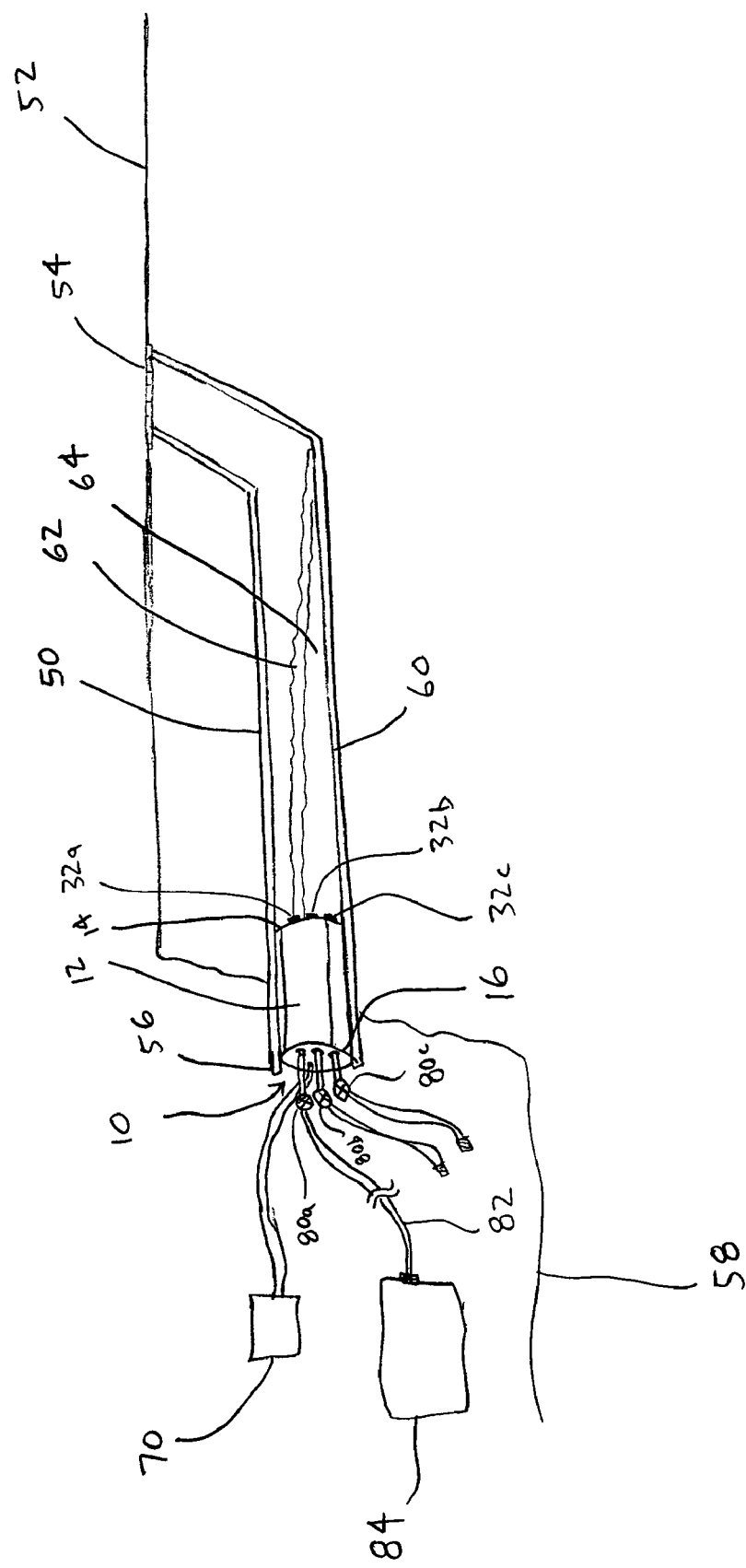
FIG. 3 is an elevation view illustrating the inflatable flow control apparatus of FIG. 1 disposed in a drain passage.

The apparatus 10 can be used to control the flow of various fluids in a variety of different structures. According to one embodiment of the present invention, the apparatus 10 is used to control the flow of fluid through the drain pipe 50 as illustrated in FIG. 3. The drain pipe 50 can be configured to receive rain water or other runoff fluid from a parking lot 52 or other area through an inlet 54 and direct the fluid through an exit 56 to a drainage area 58 such as a creek or dry bed. In operation, the apparatus 10 is disposed in the drain pipe 50 near the exit 56. The apparatus 10 is inserted into the exit 56 of the pipe 50 in a deflated configuration, with the first side 14 of the bladder 12 directed in the upstream direction of the drain pipe 50 and the second side 16 accessible from the exit 56. As shown in FIG. 3, the apparatus 10 is disposed entirely within the drain pipe 50 proximate to the exit 56, though in other embodiments, the apparatus 10 can instead extend from the exit 56 or can be disposed remotely from the exit 56. If the apparatus 10 has the reinforcement material 34 on only a portion of the bladder 12, the reinforcement material 34 is typically directed toward a bottom 60 of the drain pipe 50 to protect the bladder 12 from puncture or other wear by glass, rocks, or other debris that can collect on the bottom 60 of the drain pipe 50.

The bladder 12 is then inflated so that the outer surface 18 of the bladder 12 is disposed against the drain passage 50. For example, an air compressor 70 or other source of pressurized fluid is connected to the port 42 and actuated to inject the pressurized fluid into the bladder 12. If the pressure exceeds a predetermined maximum operating pressure, such as about 250 psi, the relief valve 44 can automatically open to vent gas from the interior space 20 of the bladder 12 until the pressure in the bladder 12 is less than the maximum operating pressure. As the bladder 12 expands to its inflated configuration, the outer surface 18 of the bladder 12 is urged into contact with the drain pipe 50 so that any fluid in the drain pipe 50 is substantially prevented from flowing between the bladder 12 and the drain pipe 50. Thus, the flow of fluid through the drain pipe 50 can be controlled by controlling the flow of the fluid through the tubular passages 30a, 30b, 30c of the apparatus 10.

In this regard, valves 80a, 80b, 80c can be provided for controlling the flow of the fluid through each of the tubular passages 30a, 30b, 30c. For example, as shown in FIG. 3, each valve 80a, 80b, 80c can be connected to a respective one of the tubular passages 30a, 30b, 30c at the second side 16 of the bladder 12. In particular, each of the valves 80a, 80b, 80c can be connected by a threaded connection or otherwise to the respective tubular passage 30a, 30b, 30c. Alternatively, the valves 80a, 80b, 80c can be secured to the tubular passages 30a, 30b, 30c by a fixed connection such as a weld or braze joint. In any case, the valves 80a, 80b, 80c can be located proximate to the second side 16, as illustrated, or can alternatively be connected to the apparatus 10 by an intermediate hose or pipe. Further, each valve 80a, 80b, 80c can be manually operable or configured to be adjusted by one or more actuators.

The valves 80a, 80b, 80c are then selectively opened and closed to control the flow of the fluid through the drain pipe 50. More particularly, the valves 80a, 80b, 80c can be selectively controlled so that fluid at different levels in the drain pipe 50 is separately evacuated from the drain pipe 50. For example, as shown in FIG. 3, the fluid in the drain pipe 50 includes first and second components 62, 64, and the fluid is stratified with the first component 62 generally floating above the second component 64. Such stratification can result if the components 62, 64 of the fluid have different weights. In one particular embodiment, the first component 62 can be a hydrocarbon fluid, such as gasoline, kerosene, or diesel fuel, and the second component 64 can be water. In other cases, the first component can be a mixture of the second component with a contaminant, and the contaminant can be a liquid or dry material.

The apparatus 10 can then be used to selectively drain a contaminant or other material from the drain pipe 50. For example, if a hydrocarbon fluid is spilled in the parking lot 52 and flows into the drain pipe 50, the apparatus 10 can be disposed at the exit 56 of the pipe to prevent the contaminant from flowing out of the pipe 50. Water or another cleaning fluid can then be delivered through the inlet 54 of the pipe 50 so that the water partially mixes with the contaminant. Advantageously, the tubular passages 30a, 30b, 30c can receive fluid at different positions on the first face 14 of the bladder 12 so that fluid at different levels in the drain pipe 50 is drained through the different tubular passages 30a, 30b, 30c. If the contaminant floats on the water in the drain pipe 50, the contaminant can be drained through one of the higher tubular passages 30a, 30b, 30c of the apparatus 10, thereby siphoning the contaminant from the drain pipe 50 while the water generally remains in the drain pipe 50. The water can then be drained through one or more of the lower tubular passages 30a, 30b, 30c. If the contaminant is heavier than the water, the contaminant can be drained first through the lower or intermediate tubular passages 30a, 30b, 30c. Alternatively, if water or other uncontaminated fluids are present in the pipe 50, some or all of the water can be drained through the appropriate drain passage(s) 30a, 30b, 30c before draining the contaminant. In some cases, additional water can be delivered into the entrance of the pipe 50 to further clean the pipe 50. Each of the fluids can be drained from the apparatus 10 through a connection hose 82 to a vessel 84 such as a tank for transporting and/or storing the respective fluid. If the water or other cleaning fluid is sufficiently free of the contaminant, the water can be drained and released in the drainage area 58.

Figure 4:
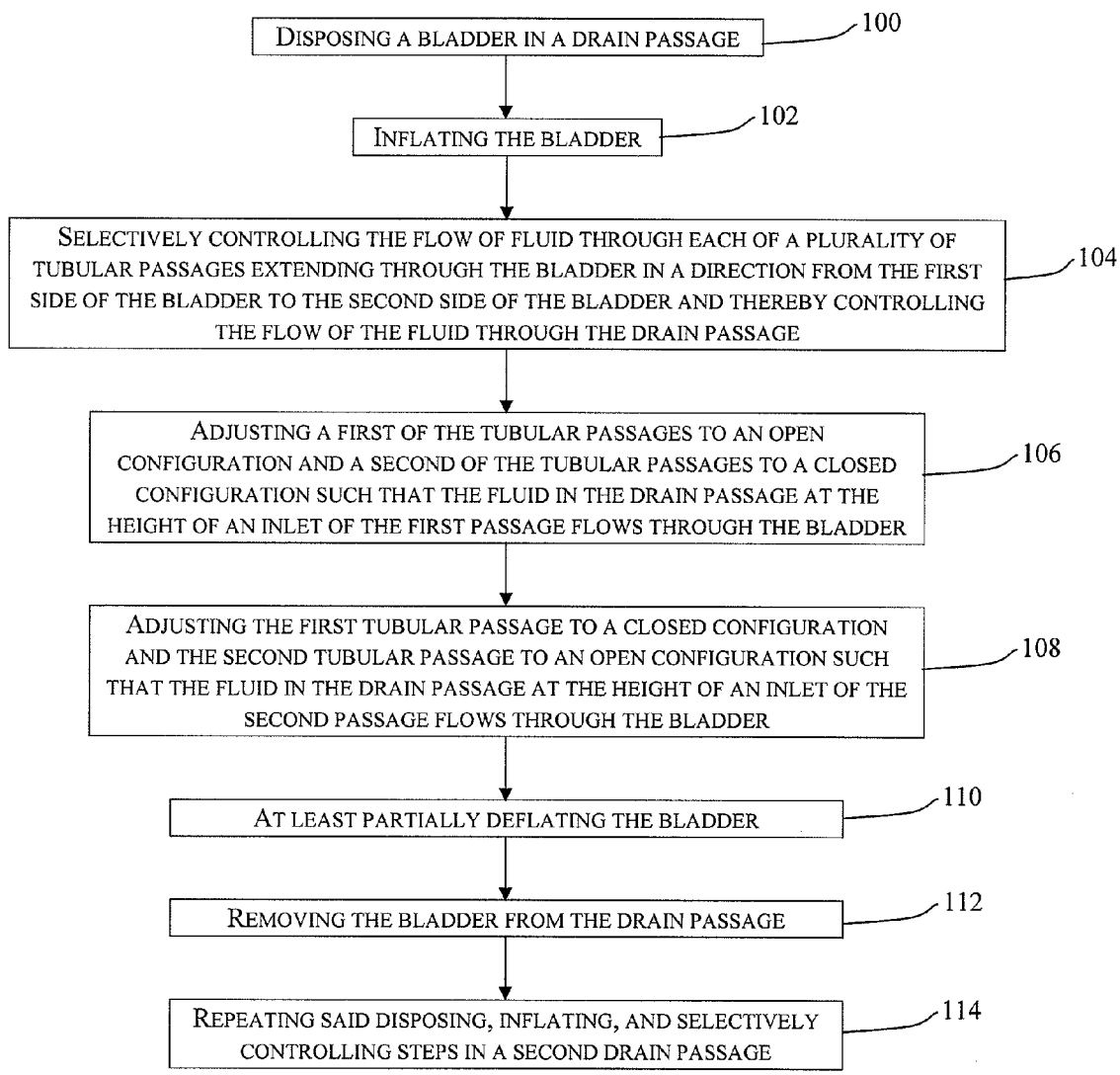
FIG. 4 is a flow diagram schematically illustrating steps according to a method of one embodiment of the present invention.

FIG. 4 schematically illustrates some of the steps for controlling the flow of a fluid through a drain passage according to one embodiment of the present invention. As illustrated, the method includes disposing a bladder in a drain passage (see block 100) and inflating the bladder (see block 102). The method further includes selectively controlling the flow of fluid through each of a plurality of tubular passages extending through the bladder in a direction from the first side of the bladder to the second side of the bladder and thereby controlling the flow of the fluid through the drain passage. See block 104. In some cases, the method includes adjusting a first of the tubular passages to an open configuration and a second of the tubular passages to a closed configuration such that the fluid in the drain passage at the height of an inlet of the first passage flows through the bladder. See block 106. Thereafter, the first tubular passage can be adjusted to a closed configuration and the second tubular passage can be adjusted to an open configuration such that the fluid in the drain passage at the height of an inlet of the second passage flows through the bladder. See block 108. In some cases, the method includes at least partially deflating the bladder (see block 110), removing the bladder from the drain passage (see block 112), and repeating the disposing, inflating, and selectively controlling steps in a second drain passage (see block 114).

It is appreciated that the apparatus 10 can be provided in a variety of sizes, shapes, and configurations. In particular, the bladder 12 can be provided with a diameter that corresponds to the inner diameter of a common drain pipe. For example, the bladder 12 can be sufficiently sized to expanded against and seal a drain pipe 50 having a inner diameter that is about 12 inches, 24 inches, 36 inches, 48 inches, or any other size. In some cases, the apparatus 10 can be capable of sealing pipes of different sizes. That is, the same apparatus 10 can be inflated to seal pipes of a range of diameters. For example, the apparatus 10 can have a nominal diameter of about 24 inches, as defined by the sides 14, 16, and used to plug pipes 50 having any diameter between about 20 inches and 36 inches. The length of the bladder 12 can be determined according to the conditions under which the apparatus 10 is to be used for sealing pipes. For example, the bladder 12 can be formed with a sufficient length for achieving enough frictional force against the pipe 50 to resist movement of the apparatus 10 in the pipe 50 even when water or other fluids in the pipe 50 push against the apparatus 10 in the longitudinal direction of the pipe 50. For example, in some cases, the bladder 12 is between about 12 and 48 inches in length.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An inflatable flow control apparatus for controlling the flow of a fluid through a drain passage, the apparatus comprising:
    an inflatable bladder having first and second opposite sides and an outer surface extending between the first and second sides;
    a plurality of tubular passages extending through the bladder between the first and second sides, each of the plurality of tubular passages defining an inlet at the first side configured to receive the fluid into the inlet from the drain passage and an outlet at the second side configured to permit the fluid to be exhausted from the tubular passage; and
    further comprising at least one reinforcement strap extending longitudinally between the first and second sides of the bladder through an interior space of the bladder; and
    a control valve fluidly connected to each of the tubular passages and configured to control the flow of the fluid therethrough,
    wherein the bladder is configured to be inflated in the drain passage such that the outer surface is disposed against the drain passage with the first and second opposite sides directed in opposite longitudinal directions of the drain passage and the fluid in the drain passage may be directed into each of the inlets, through the associated tubular passage in a direction toward the second side, and outwardly through the associated outlet.

2. An apparatus according to claim 1 wherein the inlets are defined at different positions on the first side such that the inlets of the tubular passages are configured to be positioned at different heights in the drain passage.

3. An apparatus according to claim 2 wherein the inlet of each tubular passage on the first side of the bladder is at least 6 inches from the adjacent inlets in a direction parallel to the first side.

4. An apparatus according to claim 1 wherein at least three of the tubular passages extend through the bladder, each tubular passage defining an exit at the second side of the bladder opposite the inlet at the first side of the bladder.

5. An apparatus according to claim 1 wherein the bladder is of generally cylindrical configuration when inflated and wherein each of the tubular passages is substantially parallel to a longitudinal axis of the bladder.

6. An apparatus according to claim 1 wherein the second side defines a fluid port fluidly connected to an interior space of the bladder and configured to receive a fluid for inflating the bladder.

7. An apparatus according to claim 1, further comprising a relief valve configured to release gas from the bladder and thereby maintain the bladder at a predetermined pressure.

8. An apparatus according to claim 1 wherein at least a portion of the outer surface of the bladder defines a contoured surface configured to frictionally engage the drain passage.

9. An apparatus according to claim 1, further comprising a reinforcement material disposed on at least a portion of the outer surface of the bladder.

10. An apparatus according to claim 1 wherein the reinforcement material is formed of aramid fibers.

11. An apparatus according to claim 1 wherein the bladder is formed of a polymer.

12. An apparatus according to claim 1 wherein the bladder is configured to be pressurized to at least 50 psi.

13. An apparatus according to claim 1 wherein the bladder is configured to be disposed in the drain passage with the tubular passages at an angle relative to a horizontal direction such that the flow of the fluid through the plurality of tubular passages is gravity fed.

14. An apparatus according to claim 1 wherein each strap is formed of one of the group consisting of a cable, a wire, and a rope.

15. A method for controlling the flow of a fluid through a drain passage, the method comprising:
    disposing a bladder in the drain passage such that first and second sides of the bladder are directed in opposite directions in the drain passage wherein at least one reinforcement strap extends longitudinally between the first and second sides of the bladder through an interior space of the bladder to prevent the sides from expanding outwards beyond the length of the strap during inflation of the bladder;

inflating the bladder and thereby disposing an outer surface of the bladder against the drain passage; and selectively controlling the flow of fluid through each of a plurality of tubular passages extending through the bladder in a direction from the first side of the bladder to and outwardly through the second side of the bladder by selectively controlling at least one control valve fluidly connected to each of the tubular passages and thereby controlling the flow of the fluid through the drain passage.

16. A method according to claim 15 wherein said disposing step comprises disposing the bladder in the drain passage such that inlets of the tubular passages are disposed at different heights in the drain passage.

17. A method according to claim 16 wherein said disposing step comprises disposing an inlet of a first of the tubular passages at least 6 inches higher in the drain passage than the inlet of a second of the tubular passages.

18. A method according to claim 16 wherein said controlling step comprises:

adjusting a first of the tubular passages to an open configuration and a second of the tubular passages to a closed configuration such that the fluid in the drain passage at the height of an inlet of the first passage flows through the bladder;

thereafter adjusting the first tubular passage to a closed configuration and the second tubular passage to an open configuration such that the fluid in the drain passage at the height of an inlet of the second passage flows through the bladder.

19. A method according to claim 18 wherein said disposing step comprising disposing the inlet of the first tubular passage higher than the inlet of the second tubular passage, said first providing step comprises draining a first component of the fluid from the drain passage, and said second providing step comprises draining a second component of the fluid from the drain passage, the first component being lighter than the second component.

20. A method according to claim 15, further comprising providing at least three of the tubular passages extending through the bladder between the first and second sides, each tubular passage defining an inlet at the first side of the bladder and an exit at the second side of the bladder.

21. A method according to claim 15 wherein said disposing step comprises disposing each of the tubular passages substantially parallel to a longitudinal axis of the bladder.

22. A method according to claim 15 wherein said inflating step comprises injecting a pressurized gas through a port on one of the sides of the bladder into an interior space of the bladder.

23. A method according to claim 15, further comprising releasing gas from the bladder through a relief valve to maintain the bladder at a predetermined pressure.

24. A method according to claim 15, further comprising providing a contoured material on the outer surface of the bladder and frictionally engaging the material to the drain passage.

25. A method according to claim 15, further comprising providing a reinforcement material on at least a portion of the outer surface of the bladder.

26. A method according to claim 15 wherein said inflating step comprises pressurizing the bladder to at least 50 psi.

27. A method according to claim 15 wherein said disposing step comprises disposing the bladder proximate to an end of the drain passage.

28. A method according to claim 15, further comprising:

at least partially deflating the bladder;

removing the bladder from the drain passage; and repeating said disposing, inflating, and selectively controlling steps in a second drain passage.

29. A method according to claim 15 wherein the bladder is disposed in the drain passage with the tubular passages at an angle relative to a horizontal direction such that gravity induces the flow of the fluid through the plurality of tubular passages.

30. A method according to claim 15 wherein the reinforcement strap is formed of at least one of the group consisting of a cable, a wire, and a rope.

* * * * *